United States Patent [19]

Vinatzer et al.

[11] Patent Number: 4,728,992
[45] Date of Patent: Mar. 1, 1988

[54] PROCESS AND A DEVICE FOR ADJUSTING A PHOTOGRAPHIC COLOR ENLARGING OR COPYING APPARATUS

[75] Inventors: Alex Vinatzer, Brixen/Milland; Florian Vikoler, Brixen, both of Italy

[73] Assignee: Durst Phototechnik GmbH, Bozen, Italy

[21] Appl. No.: 871,435

[22] PCT Filed: Sep. 28, 1985

[86] PCT No.: PCT/EP85/00502
§ 371 Date: May 22, 1986
§ 102(e) Date: May 22, 1986

[87] PCT Pub. No.: WO86/02175
PCT Pub. Date: Apr. 10, 1986

[30] Foreign Application Priority Data

Oct. 1, 1984 [IT] Italy .................................. 4872 A/84

[51] Int. Cl.⁴ ................................................ G03B 27/72
[52] U.S. Cl. ............................................ 355/35; 355/77
[58] Field of Search ............................... 355/77, 35, 38

[56] References Cited

U.S. PATENT DOCUMENTS 3,438,709 4/1969 Hatashita ............................. 355/35
4,174,173 11/1979 Pone, Jr. .............................. 355/38
4,417,818 11/1983 Weisner ........................... 355/35 X
4,464,045 8/1984 Findeis et al. ...................... 355/38

FOREIGN PATENT DOCUMENTS 2123968 2/1984 United Kingdom .

OTHER PUBLICATIONS

Beseler, PM2 Color Analyzer.

*Primary Examiner*—L. T. Hix
*Assistant Examiner*—Brian W. Brown
*Attorney, Agent, or Firm*—Cahill, Sutton & Thomas

[57] ABSTRACT

This invention relates to a process and a device for adjusting a photographic color enlarging or copying apparatus. By means of the measuring device that uses copying light of the enlarging apparatus to be adjusted as the measuring light, the color densities of a test copy made of a test original and of a reference copy which represents a satisfactory picture reproduction of the test original are measured selectively in the colors red, green and blue and are compared with one another. Corresponding to an existing deviation, adjusting control means at the enlarging apparatus that color-selectively influence the amount of copying light are readjusted until the deviation is balanced, and another test copy is made with the new exposure conditions and is measured.

14 Claims, 3 Drawing Figures

PROCESS AND A DEVICE FOR ADJUSTING A PHOTOGRAPHIC COLOR ENLARGING OR COPYING APPARATUS

TECHNICAL FIELD

In general, this invention relates to the field of color exposure of photographic emulsion carriers when producing copies or enlargements of a film original and concerns a process and a device for adjusting an enlarging or copying apparatus, in which case adjusting means the adjustment to a basic adjustment that, with respect to a given film paper combination, results in optimal exposure conditions for a selected film frame original having a medium distribution of color and lightness.

STATE OF THE ART ON WHICH THE APPLICATION IS BASED

The adjustment of a color enlarging apparatus with respect to a given film paper combination is not without difficulty and requires a considerable expenditure of time and material since as a rule several attempts must be made and a number of test copies must be produced.

The procedure in this case is usually such that at first in a test exposure, a first copy is made of a selected test orginal and this copy is visually evaluated. From the density errors and/or color errors that such a test copy usually has, the required corrections are determined empirically and the adjustment of the enlarging apparatus is reset correspondingly. The procedure is repeated until a test copy has the desired quality and the adjustment that resulted in this picture is used as the basic adjustment of the enlarging apparatus for the other film frame originals to be copied.

The evaluation of the test copies and especially the correct assessment of possible color abnormalities in view of the determination of the type and extent of the required corrections requires a high degree of experience, and usually different steps are required until the desired result is achieved which in addition depends on the subjective judgment of an operator.

Predominantly from the graphic field, the use of so-called densitometers is known for color density measurements on picture reproductions. Densitometers are especially known for measuring color deviations with respect to a target copy in which given reference values can be stored and the measured values are indicated as a deviation from the stored reference values. However, densitometers of this type are relatively complicated to handle and in addition, because of their high costs, are unsuitable for a wider use by amateurs. In addition, there is the difficulty of an exact conversion of the measured values indicated by the densitometer into a corresponding correction of the exposure time and/or of the color composition of the copying light. The reason is that the adjusting control means for adjusting the color filtering at the enlarging apparatus are usually not graduated in densitometric units and, in addition, during the conversion, the gamma value of the used copying material must be taken into account so that the work with measuring apparatuses of this type also requires specific experience.

DISCLOSURE OF THE INVENTION

It is the objective of the invention to provide a process and a device for adjusting a color enlarging or copying apparatus by means of which the adjustment may be carried out on the basis of objective measurements in a small number of steps without any specific experience, in which case the device must be simple to handle and cost-effective with respect to manufacturing.

Because the copying light of the enlarging apparatus is used to directly illuminate the reference copy and test copy, a change of intensity or of the color composition of the copying light can be perceived directly on the indicating device which provides the possibility of the direct conversion of an indicated deviation between the test copy and the reference copy into a correction of the exposure conditions by correspondingly influencing the copying light. The absence of a separate measuring light source makes the measuring device especially cost-effective and its costs are clearly below those of the known densitometers which mostly use expensive light sources of high constancy.

The use of a reference copy and the carrying-out of the measurement as a comparative measurement between the test copy and the reference copy results in the further advantage that no strict requirements are made on the light source constancy, and high reliability is achieved with relatively simple and inexpensive circuitry. Advantageously, the reference copy can be exchanged so that by means of a suitable selection, an adaptation can be carried out in regard to a preferred picture quality.

By the selection of a measuring position for the test copy in which it partially covers the reference copy, i.e., by setting up a certain relationship of the effective measuring surfaces of the test copy and the reference copy, a simple possibility exists for taking into account the gamma value of the used copying material.

The process and the device can be used for making copies of negative as well as positive material without the requirement of a function reversal in the measuring device. The reversal of signs in the density changes is taken into account in a simple way by reversing the sequence of the measurement of the test copy and the reference copy.

Other characteristics and advantages of the process and the device for carrying out this process according to the invention are found in the following description of a preferred embodiment.

PREFERRED EMBODIMENT OF THE INVENTION

Figure 1:
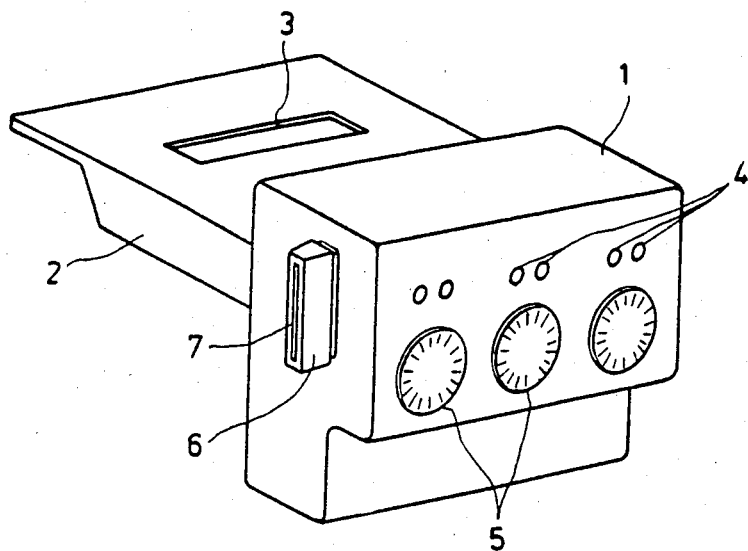
FIG. 1 is a perspective overall view of the measuring device.

FIG. 1 shows a preferred embodiment of the measuring device according to the invention. It comprises a housing 1 that is used essentially for receiving the object to be measured and the components of a measuring circuit and to which a light-guiding means 2 is connected that has a light entrance opening 3. At the front side of the housing 1, a number of indicating elements are located, such as light-emitting diodes 4, hereafter called light diodes, which are arranged in pairs, are assigned to adjustment knobs 5. The head part 6 of a measuring-object carrier projects laterally out of the housing 1, said head part 6 having a longitudinal slot 7 for receiving the test strip to be measured, as will be described in greater detail below.

Figure 2:
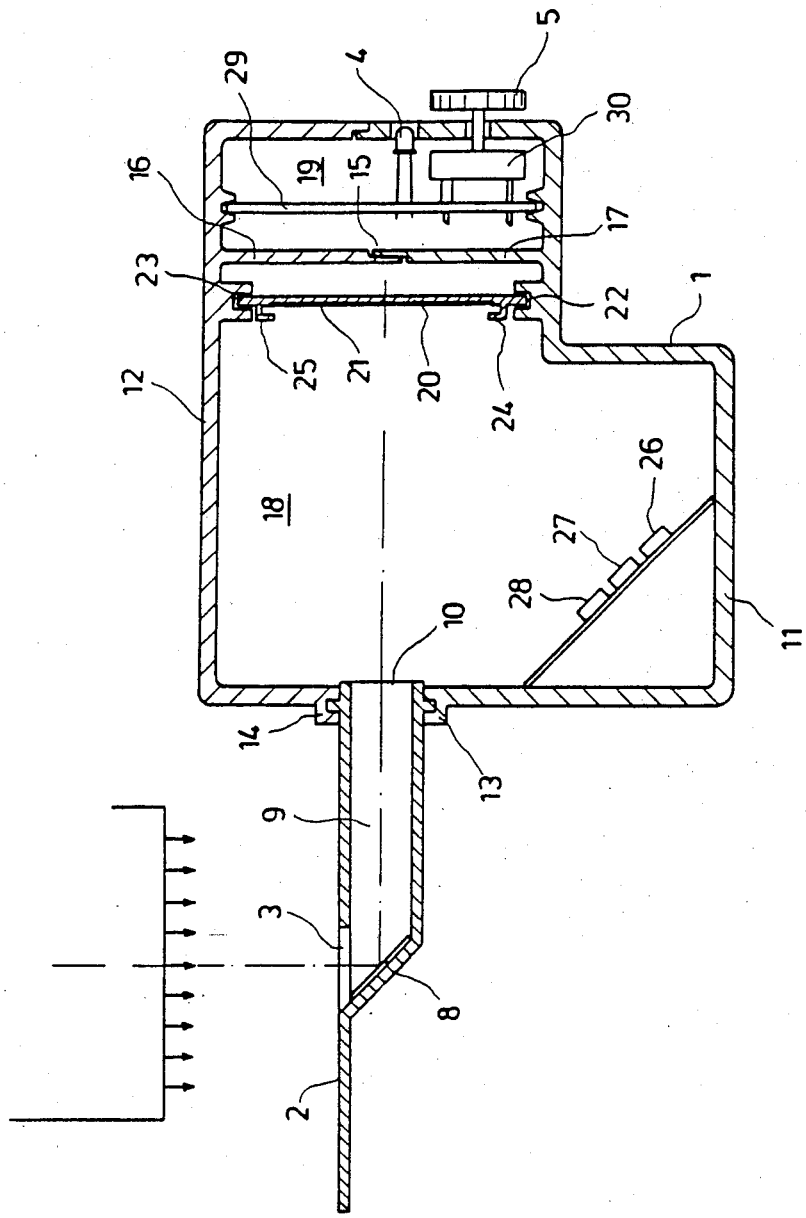
FIG. 2 is a sectional view of the device according to FIG. 1.

The operating structure of the measuring device is shown in FIG. 2. A mirror element 8 is arranged diagonally behind the entrance opening 3 of the light-guiding means 2, said mirror element 8 reflecting incident light in the direction of a light shaft 9 that has an essentially rectangular cross-section and, via a light-entrance opening 10, leads into the housing 1. The light-guiding means 2 is designed in such a way that it is received in the space of an enlarging apparatus that is intended for receiving the film carrier and light-guiding means 2 is inserted therein during the measuring process instead of the film carrier. Via the opening 3 receives, light-guiding means 2 copying light from the exposure device of the enlarging appartus.

The mechanical connection between the light-guiding means 2 and the housing 1 is preferably such that easy exchangeability exists for light-guiding means of different shapes. In the present embodiment, the housing 1 is formed by a lower part 11 and an upper part 12 that are held together by suitable connecting means, such as a screwed connection (not shown in the drawing), in which case the end of the light shaft 9 is held between gripping edges 13 and 14 of the upper and lower part. A separating wall 15 consists of partial walls 16 and 17 and divides the inside of the housing 1 into a light-proof measuring chamber 18 and a space 19 that receives the electrical components of a measuring circuit arrangement. Opposite the light-entrance opening 10 of the housing 1, at a specified distance from it, a measuring-object carrier is arranged in the form of a carrier plate 20. Said plate 20 is slidable in guides 22 and 23 that are mounted at opposite walls of the measuring chamber 18 (in the direction that is normal with respect to the plane of the drawing), and can be taken out of the housing, and has a head part 6 (see FIG. 1) that projects laterally out of the housing. The carrier plate 20 itself, on the side facing the light opening, is equipped with guide strips 24 and 25 that are used for receiving a test copy to be measured which, during the measuring step, is slid through the longitudinal slot 7 of the head part 6 of the plate onto carrier plate 20 (also see FIG. 1). Preferably, a reference copy 21 is firmly mounted on the carrier plate 20, for example, glued onto it, and a test copy to be measured is slid onto the plate and is superimposed on the reference copy. Advantageously, the guide strips 24 and 25 are equipped with adjustable stops that limit the inserting depth of the test copy and thus determine the part of the reference measuring area covered by it.

In front of the carrier plate 20 but outside the path of the rays of the light that are incident on the measuring surface of the plate, light-sensitive elements, such as photodiodes 26, 27 and 28, are arranged which in each case are sensitized in one of the basic colors red, green and blue and receive light from the reference copy or a test copy inserted into the measuring plane. The photodiodes are part of a measuring circuit with which they are connected electrically. Other components of the circuit are mounted on a printed circuit board 29 that is housed in space 19 of the housing. Particularly visible in FIG. 2 are a storage potentiometer 30 and an adjustment knob 5 assigned to it as well as a light diode 4 as an indicating element that is visible from the outside.

Figure 3:
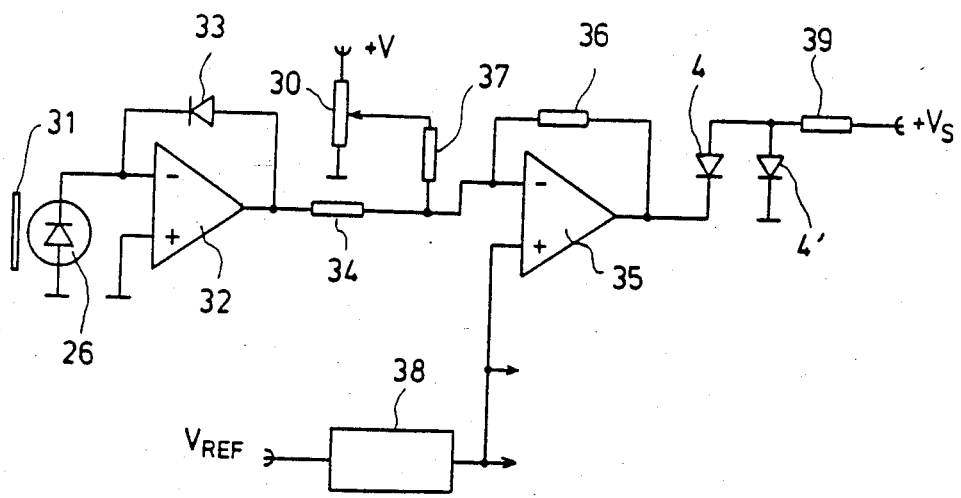
FIG. 3 is a basic circuit diagram of the measuring circuit of the device.

FIG. 3 shows the basic circuit diagram of the measuring circuit. This measuring circuit comprises a separate measuring channel for each of the basic colors red, green and blue of the measuring light. In FIG. 3, only one of the three measuring channels is shown, since the two other measuring channels are identical to it. With respect to the red measuring channel, for example, the photodiode 26 is sensitized to red by means of a red filter 31 placed in front of it. (Analogously, the photodiodes 27, 28 of the other measuring channels are sensitized to green and blue).

The photodiode 26 is connected electrically with the inverting input of an operational amplifier 32, the non-inverting input of which is located at the mass potential or ground of the circuit and which, by means of a diode 33 in the feedback branch, is wired as logarithmic current-voltage converter so that a voltage produced at the amplifier output that is proportional to the logarithm of the photocurrent of the diode 26. The output of the operational amplifier 32, via a resistor 34, is connected to the inverting input of a second operational amplifier 35 in the feedback branch of which a resistor 36 is located that, together with the resistor 34, determines the gain of the amplifier 35. A variable voltage is superposed on the output voltage of the current-voltage converter 32, said variable voltage being tapped at a potentiometer 30 located between the ground and a specified potential $+V$ and, via a resistor 37, being fed to the input inverting of the second operational amplifier 35. The non-inverting input of operational amplifier 35, via a logarithmic converter 38, is acted upon by a reference potential $V_{REF}$ that can be preset, by means of which amplifier 35 itself carries out the function of a voltage comparator. The range of the voltage that can be tapped at the potentiometer 30 covers the range of the voltage signals at the output of the amplifier 32 and at the output of the logarithmic converter 38, so that for each occurring value of these signals, the signal difference between the two inputs of the comparator by means of the potentiometer 30 can be adjusted to zero. The logarithmic converter 38 is common to all three color channels, and its output is, in addition to the operational amplifier 35, also provided to the corresponding amplifiers of the other measuring channels, so that all of them receive a joint reference potential. Two light diodes 4 and 4' that are connected in series are located at the output of the operational amplifier 35, in which case diode 4' is connected to ground, and the joint connecting point, via a multiplier resistor 39, is fed from a voltage source $+V_s$. According to the deviation of the input signal in one or the other direction with respect to the reference signal, the output of the amplifier/comparator assumes potentials of opposed polarity, by means of which, in each case, one of the two diodes 4, 4' becomes current-carrying and lights up. When the voltages at the amplifier inputs are the same, both diodes carry current at the same time, so both diodes light up at the same time. The light diodes 4 and 4' and the corresponding diodes of the other color channels therefore furnish a visible indication for each deviation of the measuring signal from a selected reference signal and, by simultaneously lighting-up, indicate a condition of balance.

The method of operation of the process according to the invention using the described measuring device is as follows: As an aid, a test negative is used having a gray patch of defined medium density, as well as a reference copy that represents a satisfactory reproduction of the gray patch of the test negative. The reference copy 21 is preferably fixed at the carrier plate 20 and extends over the measuring illuminated by the measuring light.

First, by means of the enlarging apparatus to be adjusted, a first test copy of the test negative is exposed and developed under exposure conditions adjusted on a trial basis. Then the light-guiding means of the measuring device is guided into the copying-light path of the enlarging apparatus instead of the film carrier, by means of which the carrier plate in the measuring chamber is lit by the copying light. Reference potential $V_{REF}$ used in this measuring phase is a voltage which is preferably proportional to the exposure time by means of which the test copy was made and which may, for example, be taken from an exposure switch device. Now, through the feeding slot of the head part 6 of the carrier plate, a strip of the test copy is guided into the measuring position while being superimposed on the reference copy fastened at the carrier plate, and the potentiometers 30 of each color channel, by means of adjustment knobs 5, are adjusted until the pair of diodes of each color channel lights up simultaneously. In this way, the measuring values referring to the test copy in each basic color remain stored in the control position taken up by the individual potentiometers. After this judgement, the test copy is taken out of the measuring position so that now the measuring light is reflected by the reference copy that had remained covered before. The light diodes will only continue to all stay lit when the test copy has the same color density as the reference copy, which means that the exposure conditions for the test copy already were correct. Otherwise, the light diodes, by the lighting-up of only one diode of the pair of diodes, in one or several color channels. indicate a deviation from the desired color balance which must ultimately be balanced off by modifying the exposure conditions. This is achieved by adjusting the exposure time and/or the filtering in the color head of the enlarging apparatus until the balance that can be observed at the light diodes is restored. Preferably, in this case, for the adjustment in the red channel, the exposure time is modified by adjusting the exposure switching device, and by making a corresponding change of the reference potential $V_{REF}$, for the adjustment in the green and blue channels, the magenta and yellow filters are reset in the color head. Proper adjustment of the enlarging apparatus is accomplished as soon as there is an essential agreement between the last made test copy and the reference copy which is expressed in a constant condition of balance in the measurement of both.

When translating a determined density deviation between the test copy and the reference copy into the corresponding correction of the exposure values, the gamma value of the used copying material must also be taken into account. In an especially advantageous application of the process according to the invention, this takes place by selecting the effective measuring surfaces of the reference copy and of a respective test copy at a certain proportion in size with respect to one another. In the case of an assumed gamma value of, for example, two ($\gamma=2$), the strip of the test copy is slid into the measuring position only so far that it covers only one-half of the reference copy so that a part of the measuring light received by the photodiodes originates from the part of the reference copy that remained uncovered. Preferably, the test copy strip can be pushed in up to an inserting depth that can be selected as a function of the gamma value of the used copying material.

The described adjusting process with the corresponding adaptations can also be used when copying slides on reversal material, in which case, instead of the test negative, a slide having a gray patch of a defined medium density is used and the color density corrections must take place with reversed signs. In order to nevertheless be able to obtain the correct information from the indication of the light diodes or the lighting-up of one or the other diode of a pair of diodes as to which direction the correction must take place, it is sufficient to reverse the sequence of the measurement of the test copy and the reference copy, by means of which the determined differential values also change the sign.

In the described embodiment of the measuring device, the light-guiding means is designed in such a way that it can be exchanged for the film carrier in the space of the enlarging apparatus provided for this purpose; i.e., the measuring light is taken at the level of the original. This has the advantage that the measurements can take place in daylight conditions. However, within the scope of the invention, other embodiments are also possible in which the measuring light is taken from other measuring levels, for example, directly below the lens or at the copying level of the enlarging apparatus or also at the light-emerging level of a light-mixing shaft in the direction of the path of rays in front of the film carrier. in the case where the measuring light is taken below the lens or at the copying level, a potential is advantageously selected as the reference potential $V_{REF}$ that is proportional to the set aperture value instead of a potential that depends on the exposure time.

We claim:

1. A process for adjusting the color composition of the copying light of a photographic color enlarging or copying apparatus of the type having controls for adjusting the relative amounts of the basic colors red, green and blue in the copying light, said process comprising the steps of:
   a. inserting a test original in the enlarging or copying apparatus, said test original having a gray patch of defined medium density;
   b. providing an existing reference copy of the test original which reference copy represents a satisfactory reproduction of the gray patch of the test original;
   c. inserting copying film in the film carrier of the enlarging or copying apparatus and exposing and subsequently developing the copying film to produce a test copy;
   d. illuminating the test copy and the reference copy with the copying light of the enlarging or copying apparatus, and selectively measuring the amounts of red, green and blue light reflected by each of both the test copy and the reference copy;
   e. comparing the measured red, green and blue light received from the test copy to the respective measured red, green and blue light received from the reference copy, and providing a visual indication of a deviation therebetween for each such color;
   f. adjusting the color composition of the copying light for each of the three basic colors until the amounts of light in each color measured for the test copy and reference copy are in balance; and
   g. repeating steps (c) through (f) above until, following step (e), there is no longer a visual indication of a deviation between the amounts of the copying light reflected by the most recent test copy in the three basic colors red, green and blue and the corresponding amounts of copying light reflected by the reference copy.

2. A process according to claim 1, wherein the measurements in step (d) of the test copy and the reference copy are made in successive measurements, and wherein the comparison of step (e) includes storing the measured values of the first measurement and indicating those of the second measurement as a deviation from the stored values.

3. A process according to claim 2, wherein, when the test original is a negative original, the test copy is measured, and the measured values are stored before the reference copy is measured, and when the test original is a positive original, the reference copy is measured, and the measured values are stored before the test copy is measured.

4. A process according to claim 1, wherein the color densities are determined by measuring the copying light that is reflected by measuring surfaces of a defined size of the test copy and of the reference copy.

5. A process according to claim 4, wherein the relationship of the effective measuring surfaces of the test copy and of the reference copy is selected as a function of the gamma value of the used copying material.

6. A process according to claim 5, wherein the relationship of the effective measuring surfaces of the test copy and of the reference copy is determined by the partial superimposing of both in the measuring position.

7. A measuring device for adjusting the color composition of the copying light of a photographic color enlarging or copying apparatus, said measuring device utilizing a reference copy of a test original and test copies of the test original, the reference copy of the test original representing a satisfactory reproduction thereof, and the test copies of the test original being produced by successively exposing copying film to the test original using the copying light of the enlarging or copying apparatus to be adjusted, and developing the exposed copying film to thereby produce such test copies, said measuring device including in combination:
 a. a housing;
 b. a light measuring chamber formed within said housing;
 c. receiving means disposed in said light measuring chamber for receiving and for positioning both the reference copy of the test original and a test copy of the test original;
 d. light opening means communicating with said light measuring chamber, said light opening means being adapted to be guided into the copying light path of the enlarging or copying apparatus for admitting the copying light into said light measuring chamber and directing the copying light toward the reference copy and test copy positioned by said receiving means;
 e. photoelectric transducers disposed within said light measuring chamber for receiving light reflected by the reference copy and by the test copy, said photoelectric transducers generating intensity-proportional electrical signals for each of the color components red, green and blue received thereby; and
 f. a measuring and indicating circuit coupled to said photoelectric transducers for providing a visual indication of deviations between the amounts of red, green and blue light reflected from the reference copy as compared with the respective amounts of red, green and blue light reflected from the test copy.

8. A measuring device according to claim 7, wherein said receiving means is a carrier plate that can be slid into said light measuring chamber, said carrier plate having a first side facing said light opening means, the first side of said carrier plate firmly receiving the reference copy.

9. A measuring device according to claim 8, wherein the carrier plate has guides on the first side thereof in which a test copy to be measured can be guided while being superimposed on the firmly arranged reference copy, said measuring chamber having an inserting slot through which the test copy may be inserted onto the carrier plate in its measuring position.

10. A measuring device according to claim 9, wherein the guides have adjustable stops that can be adjusted to limit the insertion depth of the test copy into said carrier plate and by means of which a test copy is held in the position of being only partially superimposed on the reference copy in order to adjust for the gamma value of the copying film.

11. A measuring device according to claim 7 wherein said light opening means includes an exchangeable light shaft having an opening for receiving the copying light of the enlarging or copying apparatus and directing the received light into said light measuring chamber, said exchangeable light shaft being adapted to be received within that portion of the enlarging or copying apparatus that is intended to receive a film carrier.

12. A measuring device according to claim 7, wherein said measuring and indicating circuit comprises three measuring channels sensitized in the colors, red, green and blue of which each has a visual indicating device.

13. A measuring device according to claim 12, wherein the measuring and indicating circuit has storage means for storing measured values from the three measuring channels.

14. A measuring device as recited by claim 13 wherein said storage means includes a potentiometer and an adjustment knob associated therewith for each of the three measuring channels to store electrical signals representative of the measured values from the three measuring channels for a first measurement of one of said reference and test copies, said measuring and indicating means comparing said stored electrical signals to the intensity proportional electrical signals generated by said photoelectric transducers during a measurement of the other of said reference and test copies to detect deviations therebetween.

* * * * *